United States Patent
Zheng et al.

(10) Patent No.: US 9,007,714 B1
(45) Date of Patent: Apr. 14, 2015

(54) DATA STORAGE DEVICE COMPRISING SLEW RATE ANTI-WINDUP COMPENSATION FOR MICROACTUATOR

(71) Applicant: Western Digital Technologies, Inc., Irvine, CA (US)

(72) Inventors: Minghui Zheng, Berkeley, CA (US); Xu Chen, San Diego, CA (US); Haiming Wang, Los Angeles, CA (US); Young-Hoon Kim, Cupertino, CA (US); Wei Xi, Mission Viejo, CA (US); Kuang-Yang Tu, Irvine, CA (US)

(73) Assignee: Western Digital Technologies Inc., Irvine, CA (US)

( * ) Notice: Subject to any disclaimer, the term of this patent is extended or adjusted under 35 U.S.C. 154(b) by 0 days.

(21) Appl. No.: 14/335,653

(22) Filed: Jul. 18, 2014

(51) Int. Cl.
*G11B 21/02* (2006.01)
*G11B 5/55* (2006.01)

(52) U.S. Cl.
CPC .................................... *G11B 5/5526* (2013.01)

(58) Field of Classification Search
None
See application file for complete search history.

(56) References Cited

U.S. PATENT DOCUMENTS

| | | | |
|---|---|---|---|
| 6,014,283 A | 1/2000 | Codilian et al. | |
| 6,052,076 A | 4/2000 | Patton, III et al. | |
| 6,052,250 A | 4/2000 | Golowka et al. | |
| 6,067,206 A | 5/2000 | Hull et al. | |
| 6,078,453 A | 6/2000 | Dziallo et al. | |
| 6,091,564 A | 7/2000 | Codilian et al. | |
| 6,094,020 A | 7/2000 | Goretzki et al. | |
| 6,101,058 A | 8/2000 | Morris | |
| 6,101,065 A | 8/2000 | Alfred et al. | |
| 6,104,153 A | 8/2000 | Codilian et al. | |
| 6,122,133 A | 9/2000 | Nazarian et al. | |
| 6,122,135 A | 9/2000 | Stich | |
| 6,141,175 A | 10/2000 | Nazarian et al. | |
| 6,160,368 A | 12/2000 | Plutowski | |
| 6,181,502 B1 | 1/2001 | Hussein et al. | |
| 6,195,222 B1 | 2/2001 | Heminger et al. | |
| 6,198,584 B1 | 3/2001 | Codilian et al. | |
| 6,198,590 B1 | 3/2001 | Codilian et al. | |
| 6,204,988 B1 | 3/2001 | Codilian et al. | |
| 6,243,223 B1 | 6/2001 | Elliott et al. | |
| 6,281,652 B1 | 8/2001 | Ryan et al. | |
| 6,285,521 B1 | 9/2001 | Hussein | |
| 6,292,320 B1 | 9/2001 | Mason et al. | |
| 6,310,742 B1 | 10/2001 | Nazarian et al. | |
| 6,320,718 B1 | 11/2001 | Bouwkamp et al. | |
| 6,330,483 B1 | 12/2001 | Dailey | |
| 6,342,984 B1 | 1/2002 | Hussein et al. | |
| 6,347,018 B1 | 2/2002 | Kadlec et al. | |
| 6,369,972 B1 | 4/2002 | Codilian et al. | |

(Continued)

OTHER PUBLICATIONS

Alexander Babinski, et al., U.S. Appl. No. 12/606,819, filed Oct. 27, 2009, 24 pages.

(Continued)

*Primary Examiner* — K. Wong (57) ABSTRACT

A data storage device is disclosed comprising a disk, a head, and a microactuator configured to actuate the head over the disk. An input signal to a compensator is generated, wherein the compensator is configured to generate a microactuator control signal. A slew rate signal representing a slew rate of the microactuator control signal is generated and applied to a first saturator configured to generate a saturated slew rate signal. The input signal is adjusted based on the slew rate saturation signal, and the microactuator is controlled based on the microactuator control signal.

18 Claims, 5 Drawing Sheets

(56) References Cited

U.S. PATENT DOCUMENTS

| | | |
|---|---|---|
| 6,369,974 B1 | 4/2002 | Asgari et al. |
| 6,462,896 B1 | 10/2002 | Codilian et al. |
| 6,465,981 B2 | 10/2002 | Zhang et al. |
| 6,476,996 B1 | 11/2002 | Ryan |
| 6,484,577 B1 | 11/2002 | Bennett |
| 6,490,119 B1 | 12/2002 | Mittal et al. |
| 6,490,121 B1 | 12/2002 | Pruett et al. |
| 6,493,169 B1 | 12/2002 | Ferris et al. |
| 6,496,324 B1 | 12/2002 | Golowka et al. |
| 6,498,698 B1 | 12/2002 | Golowka et al. |
| 6,507,450 B1 | 1/2003 | Elliott |
| 6,511,035 B1 | 1/2003 | Teel et al. |
| 6,534,936 B2 | 3/2003 | Messenger et al. |
| 6,538,839 B1 | 3/2003 | Ryan |
| 6,545,835 B1 | 4/2003 | Codilian et al. |
| 6,549,359 B1 | 4/2003 | Bennett et al. |
| 6,549,361 B1 | 4/2003 | Bennett et al. |
| 6,560,056 B1 | 5/2003 | Ryan |
| 6,568,268 B1 | 5/2003 | Bennett |
| 6,574,062 B1 | 6/2003 | Bennett et al. |
| 6,577,465 B1 | 6/2003 | Bennett et al. |
| 6,614,615 B1 | 9/2003 | Ju et al. |
| 6,614,618 B1 | 9/2003 | Sheh et al. |
| 6,636,377 B1 | 10/2003 | Yu et al. |
| 6,674,605 B1 | 1/2004 | Ell |
| 6,690,536 B1 | 2/2004 | Ryan |
| 6,693,764 B1 | 2/2004 | Sheh et al. |
| 6,707,635 B1 | 3/2004 | Codilian et al. |
| 6,710,953 B1 | 3/2004 | Vallis et al. |
| 6,710,966 B1 | 3/2004 | Codilian et al. |
| 6,714,371 B1 | 3/2004 | Codilian |
| 6,714,372 B1 | 3/2004 | Codilian et al. |
| 6,724,564 B1 | 4/2004 | Codilian et al. |
| 6,731,450 B1 | 5/2004 | Codilian et al. |
| 6,735,041 B1 | 5/2004 | Codilian et al. |
| 6,738,220 B1 | 5/2004 | Codilian |
| 6,747,837 B1 | 6/2004 | Bennett |
| 6,760,186 B1 | 7/2004 | Codilian et al. |
| 6,788,483 B1 | 9/2004 | Ferris et al. |
| 6,791,785 B1 | 9/2004 | Messenger et al. |
| 6,795,268 B1 | 9/2004 | Ryan |
| 6,819,518 B1 | 11/2004 | Melkote et al. |
| 6,819,522 B2 | 11/2004 | Atsumi et al. |
| 6,826,006 B1 | 11/2004 | Melkote et al. |
| 6,826,007 B1 | 11/2004 | Patton, III |
| 6,847,502 B1 | 1/2005 | Codilian |
| 6,850,383 B1 | 2/2005 | Bennett |
| 6,850,384 B1 | 2/2005 | Bennett |
| 6,867,944 B1 | 3/2005 | Ryan |
| 6,876,508 B1 | 4/2005 | Patton, III et al. |
| 6,882,496 B1 | 4/2005 | Codilian et al. |
| 6,885,514 B1 | 4/2005 | Codilian et al. |
| 6,900,958 B1 | 5/2005 | Yi et al. |
| 6,900,959 B1 | 5/2005 | Gardner et al. |
| 6,903,897 B1 | 6/2005 | Wang et al. |
| 6,914,740 B1 | 7/2005 | Tu et al. |
| 6,914,743 B1 | 7/2005 | Narayana et al. |
| 6,920,004 B1 | 7/2005 | Codilian et al. |
| 6,924,959 B1 | 8/2005 | Melkote et al. |
| 6,924,960 B1 | 8/2005 | Melkote et al. |
| 6,924,961 B1 | 8/2005 | Melkote et al. |
| 6,934,114 B1 | 8/2005 | Codilian et al. |
| 6,934,135 B1 | 8/2005 | Ryan |
| 6,937,420 B1 | 8/2005 | McNab et al. |
| 6,937,423 B1 | 8/2005 | Ngo et al. |
| 6,952,322 B1 | 10/2005 | Codilian et al. |
| 6,954,324 B1 | 10/2005 | Tu et al. |
| 6,958,881 B1 | 10/2005 | Codilian et al. |
| 6,963,465 B1 | 11/2005 | Melkote et al. |
| 6,965,488 B1 | 11/2005 | Bennett |
| 6,967,458 B1 | 11/2005 | Bennett et al. |
| 6,967,811 B1 | 11/2005 | Codilian et al. |
| 6,970,319 B1 | 11/2005 | Bennett et al. |
| 6,972,539 B1 | 12/2005 | Codilian et al. |
| 6,972,540 B1 | 12/2005 | Wang et al. |
| 6,972,922 B1 | 12/2005 | Subrahmanyam et al. |
| 6,975,480 B1 | 12/2005 | Codilian et al. |
| 6,977,789 B1 | 12/2005 | Cloke |
| 6,980,389 B1 | 12/2005 | Kupferman |
| 6,987,636 B1 | 1/2006 | Chue et al. |
| 6,987,639 B1 | 1/2006 | Yu |
| 6,989,954 B1 | 1/2006 | Lee et al. |
| 6,992,848 B1 | 1/2006 | Agarwal et al. |
| 6,992,851 B1 | 1/2006 | Cloke |
| 6,992,852 B1 | 1/2006 | Ying et al. |
| 6,995,941 B1 | 2/2006 | Miyamura et al. |
| 6,999,263 B1 | 2/2006 | Melkote et al. |
| 6,999,267 B1 | 2/2006 | Melkote et al. |
| 7,006,320 B1 | 2/2006 | Bennett et al. |
| 7,016,134 B1 | 3/2006 | Agarwal et al. |
| 7,023,637 B1 | 4/2006 | Kupferman |
| 7,023,640 B1 | 4/2006 | Codilian et al. |
| 7,027,256 B1 | 4/2006 | Subrahmanyam et al. |
| 7,027,257 B1 | 4/2006 | Kupferman |
| 7,035,026 B2 | 4/2006 | Codilian et al. |
| 7,038,876 B2 | 5/2006 | Morris |
| 7,046,472 B1 | 5/2006 | Melkote et al. |
| 7,050,249 B1 | 5/2006 | Chue et al. |
| 7,050,254 B1 | 5/2006 | Yu et al. |
| 7,050,258 B1 | 5/2006 | Codilian |
| 7,054,098 B1 | 5/2006 | Yu et al. |
| 7,061,714 B1 | 6/2006 | Yu |
| 7,064,918 B1 | 6/2006 | Codilian et al. |
| 7,068,451 B1 | 6/2006 | Wang et al. |
| 7,068,459 B1 | 6/2006 | Cloke et al. |
| 7,068,461 B1 | 6/2006 | Chue et al. |
| 7,068,463 B1 | 6/2006 | Ji et al. |
| 7,088,547 B1 | 8/2006 | Wang et al. |
| 7,095,579 B1 | 8/2006 | Ryan et al. |
| 7,110,208 B1 | 9/2006 | Miyamura et al. |
| 7,110,214 B1 | 9/2006 | Tu et al. |
| 7,113,362 B1 | 9/2006 | Lee et al. |
| 7,113,365 B1 | 9/2006 | Ryan et al. |
| 7,116,505 B1 | 10/2006 | Kupferman |
| 7,126,781 B1 | 10/2006 | Bennett |
| 7,158,329 B1 | 1/2007 | Ryan |
| 7,173,790 B2 | 2/2007 | Kobayashi et al. |
| 7,180,703 B1 | 2/2007 | Subrahmanyam et al. |
| 7,184,230 B1 | 2/2007 | Chue et al. |
| 7,196,864 B1 | 3/2007 | Yi et al. |
| 7,199,966 B1 | 4/2007 | Tu et al. |
| 7,203,021 B1 | 4/2007 | Ryan et al. |
| 7,209,321 B1 | 4/2007 | Bennett |
| 7,212,364 B1 | 5/2007 | Lee |
| 7,212,374 B1 | 5/2007 | Wang et al |
| 7,215,504 B1 | 5/2007 | Bennett |
| 7,224,546 B1 | 5/2007 | Orakcilar et al. |
| 7,248,426 B1 | 7/2007 | Weerasooriya et al. |
| 7,251,098 B1 | 7/2007 | Wang et al. |
| 7,253,582 B1 | 8/2007 | Ding et al. |
| 7,253,989 B1 | 8/2007 | Lau et al. |
| 7,265,933 B1 | 9/2007 | Phan et al. |
| 7,289,288 B1 | 10/2007 | Tu |
| 7,298,574 B1 | 11/2007 | Melkote et al. |
| 7,301,717 B1 | 11/2007 | Lee et al. |
| 7,304,819 B1 | 12/2007 | Melkote et al. |
| 7,330,019 B1 | 2/2008 | Bennett |
| 7,330,327 B1 | 2/2008 | Chue et al. |
| 7,333,280 B1 | 2/2008 | Lifchits et al. |
| 7,333,290 B1 | 2/2008 | Kupferman |
| 7,339,761 B1 | 3/2008 | Tu et al. |
| 7,365,932 B1 | 4/2008 | Bennett |
| 7,388,728 B1 | 6/2008 | Chen et al. |
| 7,391,583 B1 | 6/2008 | Sheh et al. |
| 7,391,584 B1 | 6/2008 | Sheh et al. |
| 7,433,143 B1 | 10/2008 | Ying et al. |
| 7,440,210 B1 | 10/2008 | Lee |
| 7,440,225 B1 | 10/2008 | Chen et al. |
| 7,450,334 B1 | 11/2008 | Wang et al. |
| 7,450,336 B1 | 11/2008 | Wang et al. |
| 7,453,661 B1 | 11/2008 | Jang et al. |
| 7,457,071 B1 | 11/2008 | Sheh |
| 7,466,509 B1 | 12/2008 | Chen et al. |
| 7,468,855 B1 | 12/2008 | Weerasooriya et al. |

(56) References Cited

U.S. PATENT DOCUMENTS

| | | |
|---|---|---|
| 7,477,471 B1 | 1/2009 | Nemshick et al. |
| 7,480,116 B1 | 1/2009 | Bennett |
| 7,489,464 B1 | 2/2009 | McNab et al. |
| 7,492,546 B1 | 2/2009 | Miyamura |
| 7,495,857 B1 | 2/2009 | Bennett |
| 7,499,236 B1 | 3/2009 | Lee et al. |
| 7,502,192 B1 | 3/2009 | Wang et al. |
| 7,502,195 B1 | 3/2009 | Wu et al. |
| 7,502,197 B1 | 3/2009 | Chue |
| 7,505,223 B1 | 3/2009 | McCornack |
| 7,542,225 B1 | 6/2009 | Ding et al. |
| 7,548,392 B1 | 6/2009 | Desai et al. |
| 7,551,390 B1 | 6/2009 | Wang et al. |
| 7,558,016 B1 | 7/2009 | Le et al. |
| 7,573,670 B1 | 8/2009 | Ryan et al. |
| 7,576,941 B1 | 8/2009 | Chen et al. |
| 7,580,212 B1 | 8/2009 | Li et al. |
| 7,583,470 B1 | 9/2009 | Chen et al. |
| 7,595,954 B1 | 9/2009 | Chen et al. |
| 7,595,956 B2 | 9/2009 | Guo et al. |
| 7,602,575 B1 | 10/2009 | Lifchits et al. |
| 7,616,399 B1 | 11/2009 | Chen et al. |
| 7,619,844 B1 | 11/2009 | Bennett |
| 7,626,782 B1 | 12/2009 | Yu et al. |
| 7,630,162 B2 | 12/2009 | Zhao et al. |
| 7,639,447 B1 | 12/2009 | Yu et al. |
| 7,656,604 B1 | 2/2010 | Liang et al. |
| 7,656,607 B1 | 2/2010 | Bennett |
| 7,660,067 B1 | 2/2010 | Ji et al. |
| 7,663,835 B1 | 2/2010 | Yu et al. |
| 7,675,707 B1 | 3/2010 | Liu et al. |
| 7,679,854 B1 | 3/2010 | Narayana et al. |
| 7,688,534 B1 | 3/2010 | McCornack |
| 7,688,538 B1 | 3/2010 | Chen et al. |
| 7,688,539 B1 | 3/2010 | Bryant et al. |
| 7,697,233 B1 | 4/2010 | Bennett et al. |
| 7,701,661 B1 | 4/2010 | Bennett |
| 7,710,676 B1 | 5/2010 | Chue |
| 7,715,138 B1 | 5/2010 | Kupferman |
| 7,729,079 B1 | 6/2010 | Huber |
| 7,733,189 B1 | 6/2010 | Bennett |
| 7,746,592 B1 | 6/2010 | Liang et al. |
| 7,746,594 B1 | 6/2010 | Guo et al. |
| 7,746,595 B1 | 6/2010 | Guo et al. |
| 7,760,461 B1 | 7/2010 | Bennett |
| 7,800,853 B1 | 9/2010 | Guo et al. |
| 7,800,856 B1 | 9/2010 | Bennett et al. |
| 7,800,857 B1 | 9/2010 | Calaway et al. |
| 7,839,591 B1 | 11/2010 | Weerasooriya et al. |
| 7,839,595 B1 | 11/2010 | Chue et al. |
| 7,839,600 B1 | 11/2010 | Babinski et al. |
| 7,839,906 B1 | 11/2010 | Sutardja et al. |
| 7,843,662 B1 | 11/2010 | Weerasooriya et al. |
| 7,852,588 B1 | 12/2010 | Ferris et al. |
| 7,852,592 B1 | 12/2010 | Liang et al. |
| 7,864,481 B1 | 1/2011 | Kon et al. |
| 7,864,482 B1 | 1/2011 | Babinski et al. |
| 7,869,155 B1 | 1/2011 | Wong |
| 7,876,522 B1 | 1/2011 | Calaway et al. |
| 7,876,523 B1 | 1/2011 | Panyavoravaj et al. |
| 7,916,415 B1 | 3/2011 | Chue |
| 7,916,416 B1 | 3/2011 | Guo et al. |
| 7,916,420 B1 | 3/2011 | McFadyen et al. |
| 7,916,422 B1 | 3/2011 | Guo et al. |
| 7,929,238 B1 | 4/2011 | Vasquez |
| 7,961,422 B1 | 6/2011 | Chen et al. |
| 8,000,053 B1 | 8/2011 | Anderson |
| 8,031,423 B1 | 10/2011 | Tsai et al. |
| 8,054,022 B1 | 11/2011 | Ryan et al. |
| 8,059,357 B1 | 11/2011 | Knigge et al. |
| 8,059,360 B1 | 11/2011 | Melkote et al. |
| 8,072,703 B1 | 12/2011 | Calaway et al. |
| 8,077,428 B1 | 12/2011 | Chen et al. |
| 8,078,901 B1 | 12/2011 | Meyer et al. |
| 8,081,395 B1 | 12/2011 | Ferris |
| 8,085,020 B1 | 12/2011 | Bennett |
| 8,116,023 B1 | 2/2012 | Kupferman |
| 8,145,934 B1 | 3/2012 | Ferris et al. |
| 8,179,626 B1 | 5/2012 | Ryan et al. |
| 8,189,286 B1 | 5/2012 | Chen et al. |
| 8,213,106 B1 | 7/2012 | Guo et al. |
| 8,254,222 B1 | 8/2012 | Tang |
| 8,300,348 B1 | 10/2012 | Liu et al. |
| 8,315,005 B1 | 11/2012 | Zou et al. |
| 8,320,069 B1 | 11/2012 | Knigge et al. |
| 8,351,174 B1 | 1/2013 | Gardner et al. |
| 8,358,114 B1 | 1/2013 | Ferris et al. |
| 8,358,145 B1 | 1/2013 | Ferris et al. |
| 8,390,367 B1 | 3/2013 | Bennett |
| 8,432,031 B1 | 4/2013 | Agness et al. |
| 8,432,629 B1 | 4/2013 | Rigney et al. |
| 8,451,697 B1 | 5/2013 | Rigney et al. |
| 8,482,873 B1 | 7/2013 | Chue et al. |
| 8,498,076 B1 | 7/2013 | Sheh et al. |
| 8,498,172 B1 | 7/2013 | Patton, III et al. |
| 8,508,881 B1 | 8/2013 | Babinski et al. |
| 8,531,798 B1 | 9/2013 | Xi et al. |
| 8,537,486 B2 | 9/2013 | Liang et al. |
| 8,542,455 B2 | 9/2013 | Huang et al. |
| 8,553,351 B1 | 10/2013 | Narayana et al. |
| 8,564,899 B2 | 10/2013 | Lou et al. |
| 8,576,506 B1 | 11/2013 | Wang et al. |
| 8,605,382 B1 | 12/2013 | Mallary et al. |
| 8,605,384 B1 | 12/2013 | Liu et al. |
| 8,610,391 B1 | 12/2013 | Yang et al. |
| 8,611,040 B1 | 12/2013 | Xi et al. |
| 8,619,385 B1 | 12/2013 | Guo et al. |
| 8,630,054 B2 | 1/2014 | Bennett et al. |
| 8,630,059 B1 | 1/2014 | Chen et al. |
| 8,634,154 B1 | 1/2014 | Rigney et al. |
| 8,634,283 B1 | 1/2014 | Rigney et al. |
| 8,643,976 B1 | 2/2014 | Wang et al. |
| 8,649,121 B1 | 2/2014 | Smith et al. |
| 8,654,466 B1 | 2/2014 | McFadyen |
| 8,654,467 B1 | 2/2014 | Wong et al. |
| 8,665,546 B1 | 3/2014 | Zhao et al. |
| 8,665,551 B1 | 3/2014 | Rigney et al. |
| 8,670,206 B1 | 3/2014 | Liang et al. |
| 8,687,312 B1 | 4/2014 | Liang |
| 8,693,123 B1 | 4/2014 | Guo et al. |
| 8,693,134 B1 | 4/2014 | Xi et al. |
| 8,699,173 B1 | 4/2014 | Kang et al. |
| 8,711,027 B1 | 4/2014 | Bennett |
| 8,717,696 B1 | 5/2014 | Ryan et al. |
| 8,717,699 B1 | 5/2014 | Ferris |
| 8,717,704 B1 | 5/2014 | Yu et al. |
| 8,724,245 B1 | 5/2014 | Smith et al. |
| 8,724,253 B1 | 5/2014 | Liang et al. |
| 8,724,524 B2 | 5/2014 | Urabe et al. |
| 8,737,008 B1 | 5/2014 | Watanabe et al. |
| 8,737,013 B2 | 5/2014 | Zhou et al. |
| 8,743,495 B1 | 6/2014 | Chen et al. |
| 8,743,503 B1 | 6/2014 | Tang et al. |
| 8,743,504 B1 | 6/2014 | Bryant et al. |
| 8,749,904 B1 | 6/2014 | Liang et al. |
| 8,760,796 B1 | 6/2014 | Lou et al. |
| 8,767,332 B1 | 7/2014 | Chahwan et al. |
| 8,767,343 B1 | 7/2014 | Helmick et al. |
| 8,767,354 B1 | 7/2014 | Ferris et al. |
| 8,773,787 B1 | 7/2014 | Beker |
| 8,779,574 B1 | 7/2014 | Agness et al. |
| 8,780,473 B1 | 7/2014 | Zhao et al. |
| 8,780,477 B1 | 7/2014 | Guo et al. |
| 8,780,479 B1 | 7/2014 | Helmick et al. |
| 8,780,489 B1 | 7/2014 | Gayaka et al. |
| 8,792,202 B1 | 7/2014 | Wan et al. |
| 8,797,664 B1 | 8/2014 | Guo et al. |
| 8,804,267 B2 | 8/2014 | Huang et al. |
| 2006/0039079 A1 | 2/2006 | Kobayashi et al. |
| 2010/0035085 A1 | 2/2010 | Jung et al. |
| 2012/0284493 A1 | 11/2012 | Lou et al. |

(56) References Cited

U.S. PATENT DOCUMENTS

2013/0120870 A1    5/2013    Zhou et al.
2013/0148240 A1    6/2013    Ferris et al.

OTHER PUBLICATIONS

S. J. Schroeck, W. C. Messner, and R. J. McNab, "On compensator design for linear time-invariant dual-input single-output systems," IEEE Transactions on Magnetics, vol. 6, No. 1, pp. 50-57, 2001.

M. Kobayashi, S. Nakagawa, T. Atsumi, and T. Yamaguchi, "High bandwidth servo control designs for magnetic disc drives," in Proc. IEEE/ASME Intern. Conf. Adv. Intel. Mechatr., (Como, Italy), pp. 1124-1129, 2001.

G. Herrmann, M. C. Turner, I. Postlethwaite, and G. Guo, "Practical implementation of a novel anti-windup scheme in a hdd-dual-stage servo-system," IEEE/ASME Transactions on Mechatronics, vol. 9, No. 3, pp. 580-592, 2004.

G. Herrmann, M. C. Turner, and I. Postlethwaite, "Discretetime and sampled data antiwindup synthesis: stability and performance," International Journal of Systems Science, vol. 37, No. 2, pp. 91-113, 2006.

G. Grimm, J. Hatfield, I. Postlethwaite, A. R. Teel, M. C. Turner, and L. Zaccarian, "Antiwindup for stable linear systems with input saturation: An lmi-based synthesis," IEEE Trans. on Automatic Control, vol. 48, pp. 1509-1525, Sep. 2003.

J. G. da Silva Jr., S. Tarbouriech, and R. Reginatto, "Analysis of regions of stability for linear systems with saturating inputs through an anti-windup scheme," in Proceedings of the IEEE Conference on Control Applications, 2002.

S. Crawshaw and G. Vinnicombe, "Anti-windup synthesis for guaranteed l2 performance," in Proceedings of the IEEE Conference on Decision and Control, 2000.

] H. Pan and V. Kapila, "Lmi-based control of discrete-time systems with actuator amplitude and rate nonlinearities," in Proceedings of American Control Conference, pp. 4140-4145, 2001.

J. da Silva, D. Limon, T. Alamo, and E. Camacho, "Dynamic output feedback for discrete-time systems under amplitude and rate actuator constraints," IEEE Trans. on Automatic Control, vol. 53, pp. 2367-2372, Nov. 2008.

DATA STORAGE DEVICE COMPRISING SLEW RATE ANTI-WINDUP COMPENSATION FOR MICROACTUATOR

BACKGROUND

Data storage devices such as disk drives comprise a disk and a head connected to a distal end of an actuator arm which is rotated about a pivot by a voice coil motor (VCM) to position the head radially over the disk. The disk comprises a plurality of radially spaced, concentric tracks for recording user data sectors and servo sectors. The servo sectors comprise head positioning information (e.g., a track address) which is read by the head and processed by a servo control system to control the actuator arm as it seeks from track to track.

Figure 1:
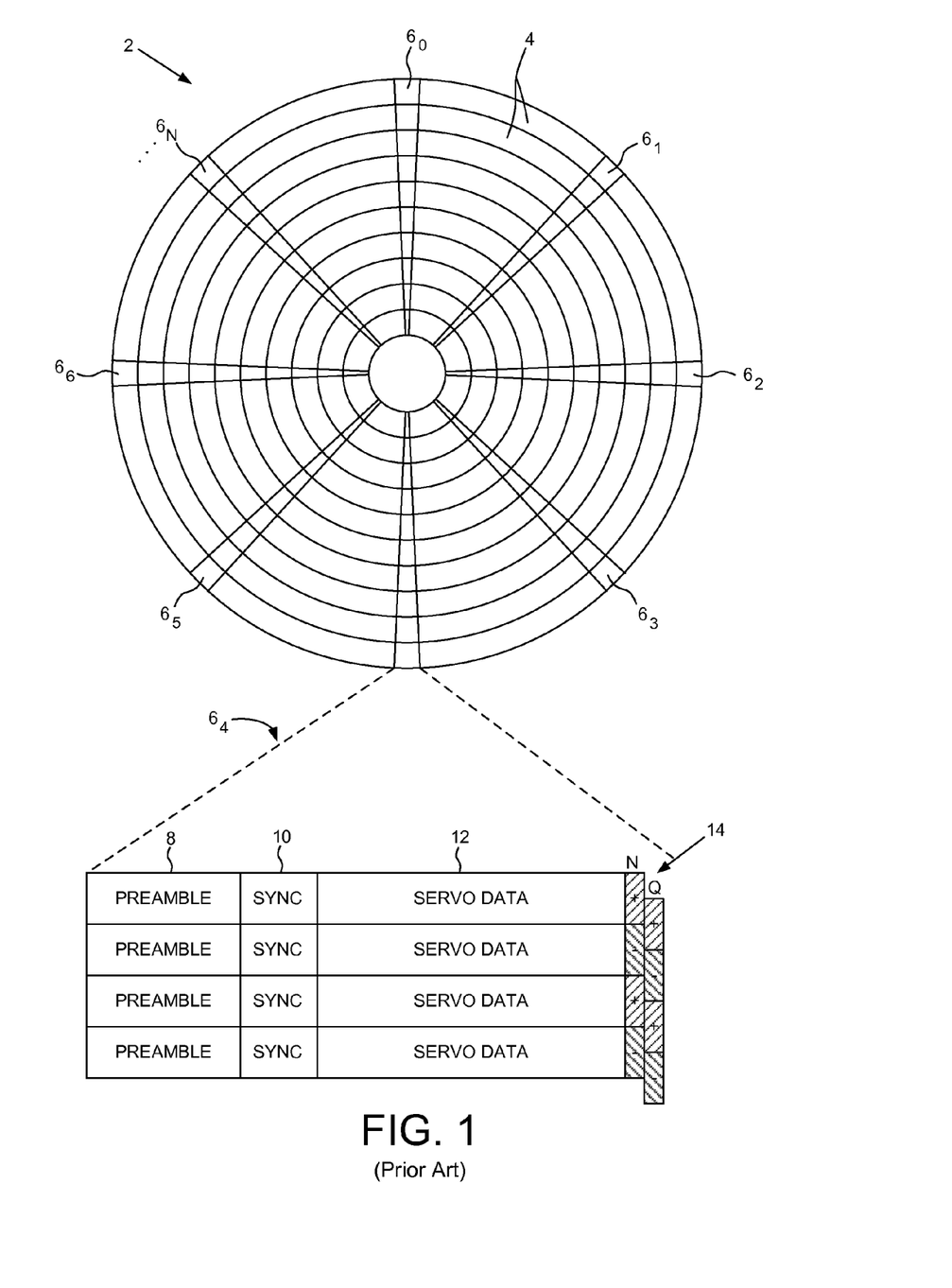
FIG. 1 shows a prior art disk format comprising a plurality of servo tracks defined by servo sectors.

FIG. 1 shows a prior art disk format 2 as comprising a number of servo tracks 4 defined by servo sectors $6_0$-$6_N$ recorded around the circumference of each servo track. Each servo sector $6_i$ comprises a preamble 8 for storing a periodic pattern, which allows proper gain adjustment and timing synchronization of the read signal, and a sync mark 10 for storing a special pattern used to symbol synchronize to a servo data field 12. The servo data field 12 stores coarse head positioning information, such as a servo track address, used to position the head over a target data track during a seek operation. Each servo sector $6_i$ further comprises groups of servo bursts 14 (e.g., N and Q servo bursts), which are recorded with a predetermined phase relative to one another and relative to the servo track centerlines. The phase based servo bursts 14 provide fine head position information used for centerline tracking while accessing a data track during write/read operations. A position error signal (PES) is generated by reading the servo data 12 and servo bursts 14, wherein the PES represents a measured position of the head relative to a centerline of a target servo track. A servo controller processes the PES to generate a control signal applied to a head actuator (e.g., a voice coil motor) in order to actuate the head radially over the disk in a direction that reduces the PES.

DETAILED DESCRIPTION

Figure 2A:
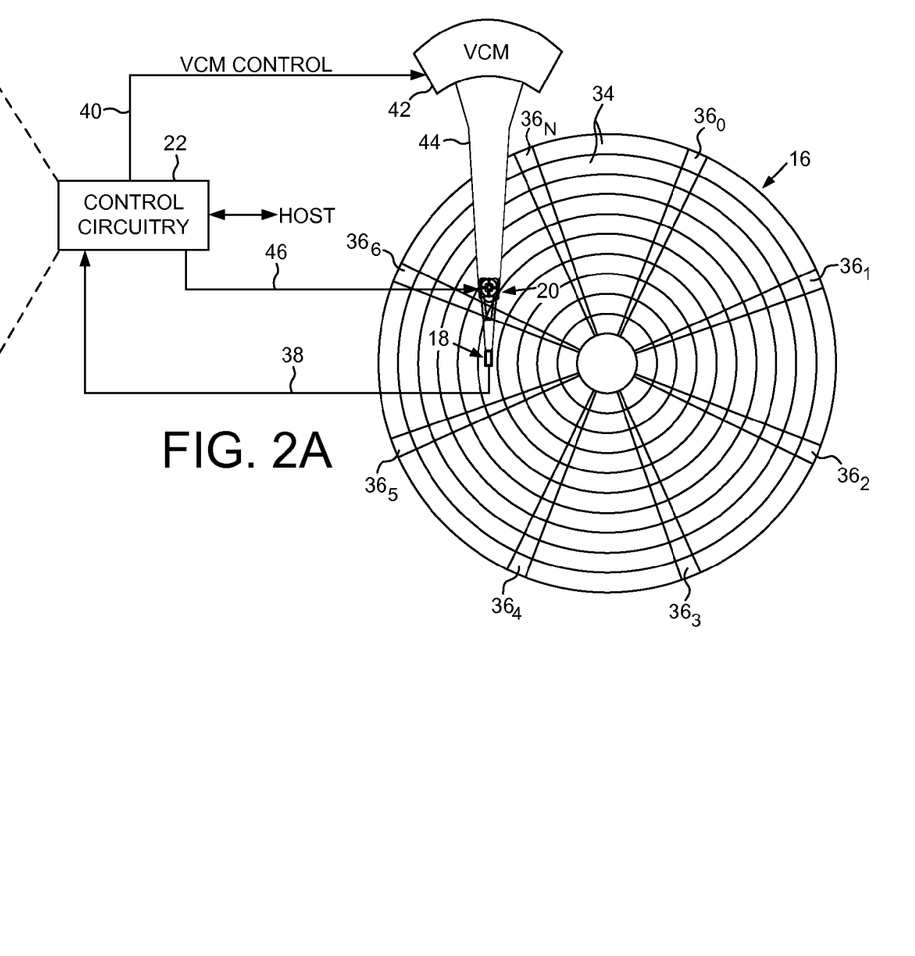
FIG. 2A shows a data storage device in the form of a disk drive according to an embodiment comprising a head actuated over a disk by a microactuator.
Figure 2B:
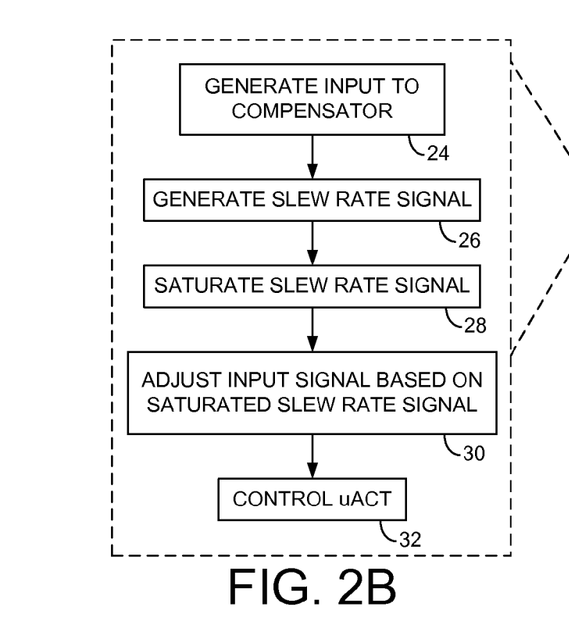
FIG. 2B is a flow diagram according to an embodiment wherein an input to a compensator is adjusted based on a saturated slew rate signal.

FIG. 2A shows a data storage device in the form of a disk drive according to an embodiment comprising a disk 16, a head 18, and a microactuator 20 configured to actuate the head 18 over the disk 16. The disk drive further comprises control circuitry 22 configured to execute the flow diagram of FIG. 2B. An input signal to a compensator is generated (block 24), wherein the compensator is configured to generate a microactuator control signal. A slew rate signal representing a slew rate of the microactuator control signal is generated (block 26) and applied to a first saturator configured to generate a saturated slew rate signal (block 28). The input signal is adjusted based on the slew rate saturation signal (block 30), and the microactuator is controlled based on the microactuator control signal (block 32).

In the embodiment of FIG. 2A, a plurality of concentric servo tracks 34 are defined by embedded servo sectors $36_0$-$36_N$, wherein concentric data tracks may be defined relative to the servo tracks 34 at the same or different radial density. The control circuitry 22 processes a read signal 38 emanating from the head 18 to demodulate the servo sectors and generate a position error signal (PES) representing an error between the actual position of the head and a target position relative to a target track. The control circuitry 22 filters the PES using a suitable compensator to generate a control signal 40 applied to a voice coil motor (VCM) 42 which rotates an actuator arm 44 about a pivot in order to actuate the head 18 radially over the disk 16 in a direction that reduces the PES. The control circuitry 22 also generates a control signal 46 applied to a microactuator 20 in order to actuate the head 18 over the disk 16 in fine movements. Any suitable microactuator may be employed, such as a piezoelectric actuator. In addition, the microactuator may actuate the head 18 over the disk 16 in any suitable manner, such as by actuating a suspension relative to the actuator arm, or actuating a slider relative to the suspension. The servo sectors $36_0$-$36_N$ may comprise any suitable head position information, such as a track address for coarse positioning and servo bursts for fine positioning. The servo bursts may comprise any suitable pattern, such as an amplitude based servo pattern or a phase based servo pattern.

In one embodiment, the slew rate of the control signal 46 applied to the microactuator 20 in FIG. 2A is limited (using a saturator) in order to reduce excitation of mechanical resonances when the disk drive is subjected to a disturbance, such as an external acoustic vibration, or a physical shock to the disk drive. However, saturating the slew rate of the control signal 46 for an extended period can lead to instability of the closed-loop servo control system. Accordingly, in one embodiment the control circuitry 22 that implements the servo control system achieves stability during slew rate saturation by adjusting the input to the compensator rather than modifying the compensator itself which can be overly complex.

Figure 3A:
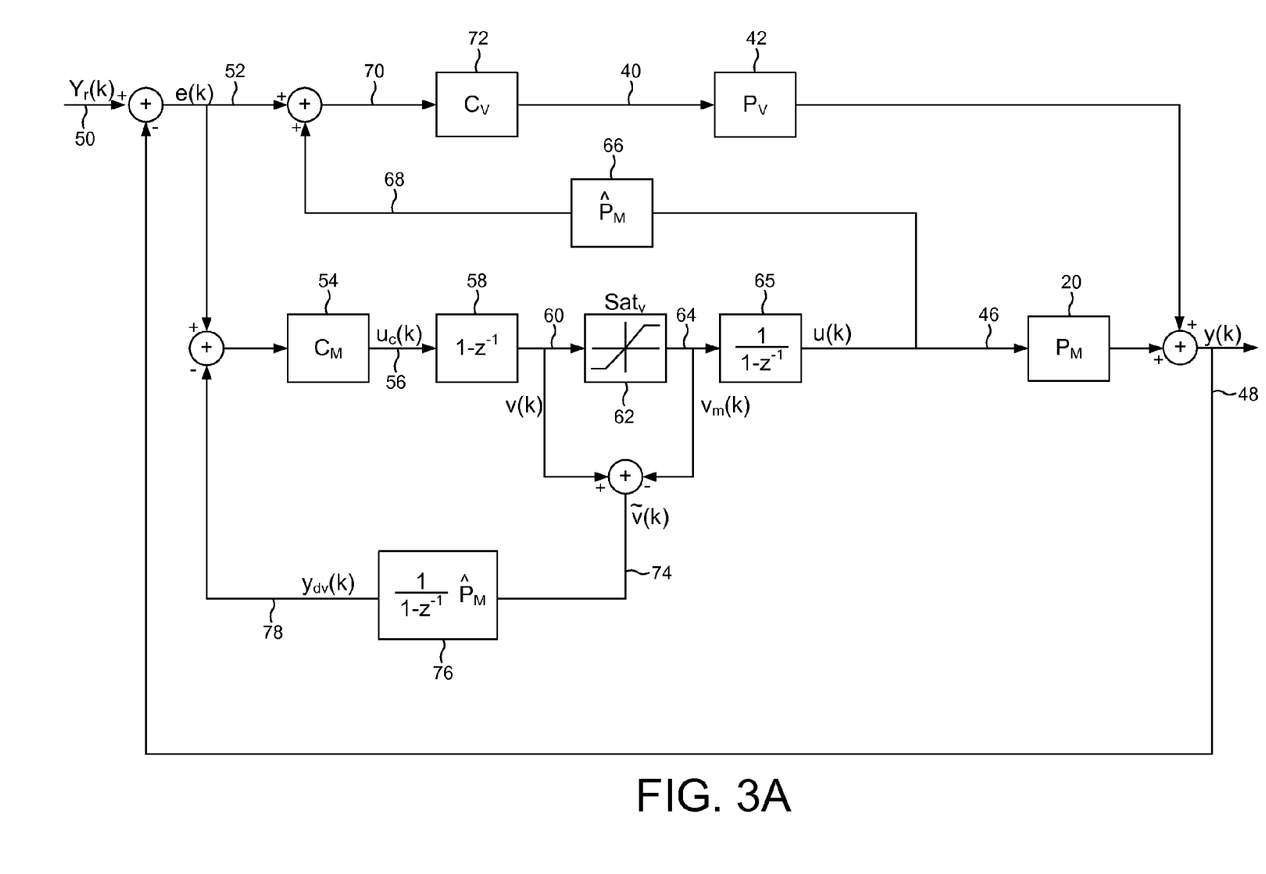
FIG. 3A shows control circuitry according to an embodiment wherein a microactuator control signal is differentiated to generate a slew rate signal, the slew rate signal is saturated, and the input to the compensator adjusted based on a difference between the slew rate signal and the saturated slew rate signal.

FIG. 3A shows an example embodiment of control circuitry 22 that implements a servo control system for a VCM 42 and a microactuator 20. The combined response of the VCM 42 and microactuator 20 is measured by reading the servo sectors $36_0$-$36_N$ to generate a measured position 48 of the head 18. The measured position 48 is subtracted from a target position 50 to generate a position error signal (PES) 52. When the slew rate of the microactuator control signal 46 is unsaturated, the PES 52 is input into a microactuator compensator 54 unadjusted, wherein the microactuator compensator 54 generates a microactuator control signal 56. The microactuator control signal 56 is differentiated 58 to generate a slew rate signal 60 representing the slew rate of the microactuator control signal 56. The slew rate signal 60 is applied to a slew rate saturator 62 configured to generate a saturated slew rate signal 64. The saturated slew rate signal 64 is integrated 65 to generate the control signal 46 applied to the microactuator 20. The effect on the position of the head 18 by the microactuator 20 due to the control signal 46 is estimated by processing the control signal 46 with a model 66 of the microactuator 20. The estimated change in position 68 is combined with the PES 52 to generate an adjusted PES 70 with the effect of the microactuator 20 canceled. The adjusted PES 70 is processed by a VCM compensator 72 which generates the VCM control signal 40 applied to the VCM 42.

When the slew rate signal 60 exceeds the limits of the slew rate saturator 62, a difference signal 74 is generated representing a difference between the slew rate signal 60 and the saturated slew rate signal 64. The difference signal 74 is applied to the model of the microactuator and the resulting response integrated 76 to generate a corresponding position signal 78 that is subtracted from the PES 52 in order to adjust the input to the microactautor compensator 54. Adjusting the input to the microactuator compensator 54 in this manner helps maintain stability of the closed-loop servo control system without requiring a more sophisticated anti-windup compensator.

Figure 3B:
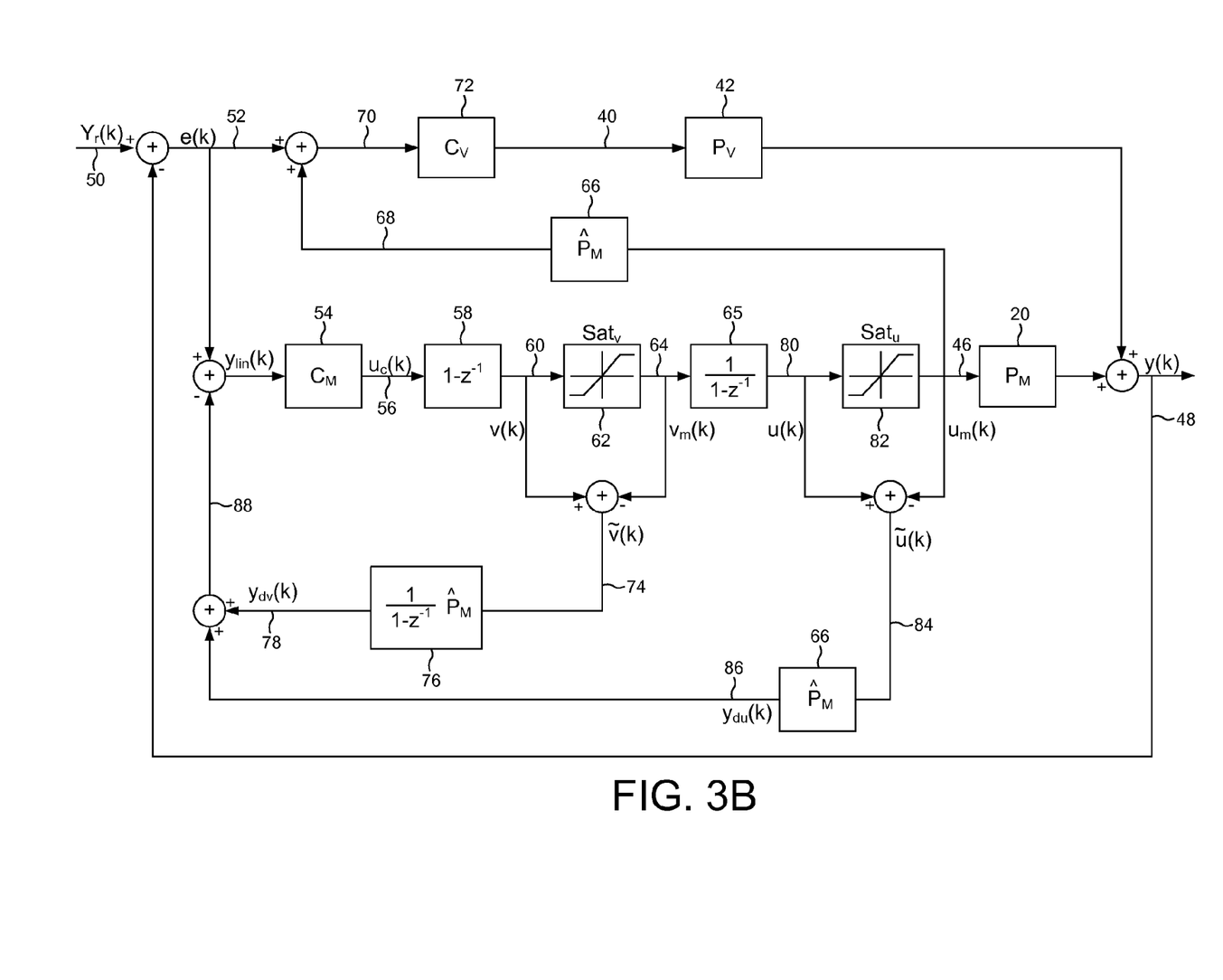
FIG. 3B shows control circuitry according to an embodiment wherein the input to the compensator is also adjusted based on a saturated amplitude signal.

In one embodiment, the control signal 46 applied to the microactuator 20 is also amplitude constrained (using a saturator) so as to prevent overdriving and damaging the microactuator 20. FIG. 3B shows control circuitry according to this embodiment wherein the amplitude signal 80 generated by the integrator 65 is input into an amplitude saturator 82. When the amplitude signal 80 exceeds the limits of the amplitude saturator 82, a difference signal 84 is generated representing a difference between the amplitude signal 80 and the saturated amplitude signal 46. The difference signal 84 is applied to the model of the microactuator 66 to generate a corresponding position signal 86 which is added to the position signal 78 to generate the position signal 88 used to adjust the input of the microactuator compensator 54. The overall system dynamic equations of the servo control system shown in FIG. 3B may be represented as:

$$u_c(k)=C_M(z)y_{lin}(k)$$

$$v(k)=u_c(k)-u_c(k-1)$$

$$v_m(k)=\text{Sat}_v(v(k))$$

$$u(k)=u(k-1)+v_m(k)$$

$$u_m(k)=\text{Sat}_u(u(k))$$

$$y_{lin}(k)=y_r(k)-y_{dv}(k)-y_{du}(k)$$

Figure 4:
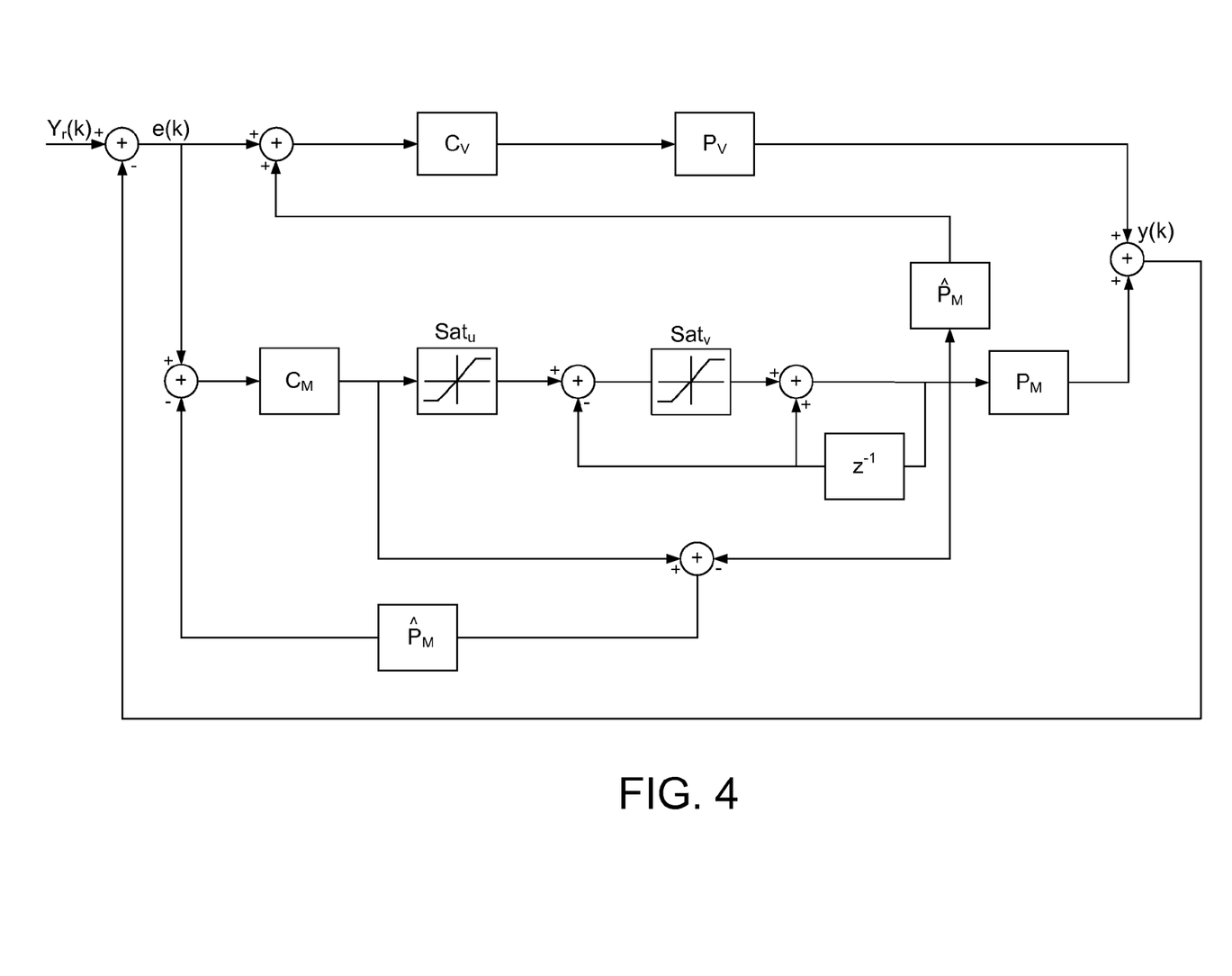
FIG. 4 shows a reduced complexity embodiment that is equivalent to the embodiment of FIG. 3B.

FIG. 4 shows a transformation of the above equations in order to implement an equivalent servo control system having reduced cost and complexity.

Any suitable saturation levels may be employed in the slew rate saturator 62 and the amplitude saturator 82 of FIG. 3B. In one embodiment, the saturations levels may be selected by optimizing a subset of disk drives, and then loading the optimized saturation levels into each production disk drive. In another embodiment, the saturation levels may be optimized (or further tuned) within each production disk drive by the control circuitry 22 executing any suitable optimization algorithm.

Any suitable control circuitry may be employed to implement the flow diagrams in the above embodiments, such as any suitable integrated circuit or circuits. For example, the control circuitry may be implemented within a read channel integrated circuit, or in a component separate from the read channel, such as a disk controller, or certain operations described above may be performed by a read channel and others by a disk controller. In one embodiment, the read channel and disk controller are implemented as separate integrated circuits, and in an alternative embodiment they are fabricated into a single integrated circuit or system on a chip (SOC). In addition, the control circuitry may include a suitable preamp circuit implemented as a separate integrated circuit, integrated into the read channel or disk controller circuit, or integrated into a SOC.

In one embodiment, the control circuitry comprises a microprocessor executing instructions, the instructions being operable to cause the microprocessor to perform the flow diagrams described herein. The instructions may be stored in any computer-readable medium. In one embodiment, they may be stored on a non-volatile semiconductor memory external to the microprocessor, or integrated with the microprocessor in a SOC. In another embodiment, the instructions are stored on the disk and read into a volatile semiconductor memory when the disk drive is powered on. In yet another embodiment, the control circuitry comprises suitable logic circuitry, such as state machine circuitry.

In various embodiments, a disk drive may include a magnetic disk drive, an optical disk drive, etc. In addition, while the above examples concern a disk drive, the various embodiments are not limited to a disk drive and can be applied to other data storage devices and systems, such as magnetic tape drives, solid state drives, hybrid drives, etc. In addition, some embodiments may include electronic devices such as computing devices, data server devices, media content storage devices, etc. that comprise the storage media and/or control circuitry as described above.

The various features and processes described above may be used independently of one another, or may be combined in various ways. All possible combinations and subcombinations are intended to fall within the scope of this disclosure. In addition, certain method, event or process blocks may be omitted in some implementations. The methods and processes described herein are also not limited to any particular sequence, and the blocks or states relating thereto can be performed in other sequences that are appropriate. For example, described tasks or events may be performed in an order other than that specifically disclosed, or multiple may be combined in a single block or state. The example tasks or events may be performed in serial, in parallel, or in some other manner. Tasks or events may be added to or removed from the disclosed example embodiments. The example systems and components described herein may be configured differently than described. For example, elements may be added to, removed from, or rearranged compared to the disclosed example embodiments.

While certain example embodiments have been described, these embodiments have been presented by way of example only, and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions and changes in the form of the methods and systems described herein may be made without departing from the spirit of the embodiments disclosed herein.

What is claimed is:
1. A data storage device comprising:
   a disk;
   a head;
   a microactuator configured to actuate the head over the disk; and control circuitry configured to:
  generate an input signal to a compensator, wherein the compensator is configured to generate a microactuator control signal;
  generate a slew rate signal representing a slew rate of the microactuator control signal;
  apply the slew rate signal to a first saturator configured to generate a saturated slew rate signal;
  adjust the input signal based on the slew rate saturation signal; and
  control the microactuator based on the microactuator control signal.

2. The data storage device as recited in claim 1, wherein the control circuitry is further configured to adjust the input signal based on a difference signal representing a difference between the slew rate signal and the saturated slew rate signal.

3. The data storage device as recited in claim 2, wherein the control circuitry is further configured to differentiate the microactuator control signal to generate the slew rate signal.

4. The data storage device as recited in claim 3, wherein the control circuitry is further configured to:
  integrate the difference signal; and
  adjust the input signal based on the integrated difference.

5. The data storage device as recited in claim 3, wherein when the control circuitry is further configured to:
  integrate the saturated slew rate signal;
  apply the integrated saturated slew rate signal to a second saturator configured to generate a saturated microactuator control signal; and
  control the microactuator based on the saturated microactuator control signal.

6. The data storage device as recited in claim 5, wherein the control circuitry is further configured to adjust the input signal based on the saturated microactuator control signal.

7. The data storage device as recited in claim 1, wherein the control circuitry is further configured to:
  apply the microactuator control signal to a second saturator configured to generate a saturated amplitude signal; and
  generate the slew rate signal based on the saturated amplitude signal.

8. The data storage device as recited in claim 7, wherein the control circuitry is further configured to adjust the input signal based on a difference signal representing a difference between the microactuator control signal and the saturated slew rate signal.

9. The data storage device as recited in claim 8, wherein the control circuitry is further configured to:
  process the difference signal with a model of the microactautor to generate a compensation signal; and
  adjust the input signal based on the compensation signal.

10. A method of operating a data storage device, the method comprising:
  generating an input signal to a compensator, wherein the compensator is configured to generate a microactuator control signal for a microactuator configured to actuate a head over a disk;
  generating a slew rate signal representing a slew rate of the microactuator control signal;
  applying the slew rate signal to a first saturator configured to generate a saturated slew rate signal;
  adjusting the input signal based on the slew rate saturation signal; and
  controlling the microactuator based on the microactuator control signal.

11. The method as recited in claim 10, further comprising adjusting the input signal based on a difference signal representing a difference between the slew rate signal and the saturated slew rate signal.

12. The method as recited in claim 11, further comprising differentiating the microactuator control signal to generate the slew rate signal.

13. The method as recited in claim 12, further comprising:
  integrating the difference signal; and
  adjusting the input signal based on the integrated difference.

14. The method as recited in claim 12, further comprising:
  integrating the saturated slew rate signal;
  applying the integrated saturated slew rate signal to a second saturator configured to generate a saturated microactuator control signal; and
  controlling the microactuator based on the saturated microactuator control signal.

15. The method recited in claim 14, further comprising adjusting the input signal based on the saturated microactuator control signal.

16. The method as recited in claim 10, further comprising:
  applying the microactuator control signal to a second saturator configured to generate a saturated amplitude signal; and
  generating the slew rate signal based on the saturated amplitude signal.

17. The method as recited in claim 16, further comprising adjusting the input signal based on a difference signal representing a difference between the microactuator control signal and the saturated slew rate signal.

18. The method as recited in claim 17, further comprising:
  processing the difference signal with a model of the microactautor to generate a compensation signal; and
  adjusting the input signal based on the compensation signal.

* * * * *